United States Patent
Kaima et al.

(10) Patent No.: US 8,064,094 B2
(45) Date of Patent: Nov. 22, 2011

(54) METHOD AND APPARATUS FOR PERFORMING IMAGE SIZE ADJUSTMENT

(75) Inventors: Nobuyoshi Kaima, Tokyo (JP); Hiroshi Ishii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 497 days.

(21) Appl. No.: 12/207,845

(22) Filed: Sep. 10, 2008

(65) Prior Publication Data
US 2009/0066981 A1    Mar. 12, 2009

(30) Foreign Application Priority Data

Sep. 11, 2007  (JP) ................................. 2007-235512
Aug. 19, 2008  (JP) ................................. 2008-211137

(51) Int. Cl.
    *G06K 15/02*    (2006.01)
(52) U.S. Cl. .......... 358/1.2; 358/448; 358/451; 358/528
(58) Field of Classification Search .................... 358/1.9, 358/1.2, 448, 451, 528; 347/249
See application file for complete search history.

(56) References Cited

U.S. PATENT DOCUMENTS

| | | | |
|---|---|---|---|
| 4,686,580 A * | 8/1987 | Kato et al. ..................... | 358/451 |
| 5,367,381 A * | 11/1994 | Curry .......................... | 358/3.07 |
| 5,991,464 A | 11/1999 | Hsu et al. | |
| 6,317,523 B1 * | 11/2001 | Miura et al. .................. | 382/298 |
| 6,731,414 B1 | 5/2004 | Ito | |
| 2004/0091269 A1 * | 5/2004 | Green et al. .................. | 398/130 |
| 2007/0122210 A1 | 5/2007 | Sato et al. | |
| 2007/0140721 A1 | 6/2007 | Shinohara et al. | |

FOREIGN PATENT DOCUMENTS

| | | |
|---|---|---|
| EP | 0 745 957 A2 | 12/1996 |
| EP | 0 745 957 A3 | 12/1996 |
| JP | 3373266 | 11/2002 |
| JP | 2 006-2701 49 | 10/2006 |
| JP | 2007-134887 | 5/2007 |
| JP | 3990086 | 7/2007 |

\* cited by examiner

*Primary Examiner* — King Poon
*Assistant Examiner* — Jamares Q Washington
(74) *Attorney, Agent, or Firm* — Oblon, Spivak, McClelland, Maier & Neustadt, L.L.P.

(57) ABSTRACT

A position deciding unit decides a correction target position in the image data from a position of a reference pixel in the image data based on size-adjustment proportion and a correcting unit performs correction with respect to the correction target position. A size adjusting unit adjusts a size of the image data by performing sub-scanning direction processing including causing the position deciding unit to sequentially decide positions of a plurality of correction target pixels in one line of pixels along a sub-scanning direction and causing the correcting unit to sequentially perform correction with respect to the correction target positions, and performing main-scanning direction processing including performing the sub-scanning direction processing for all the lines of pixels in the sub-scanning direction.

15 Claims, 15 Drawing Sheets

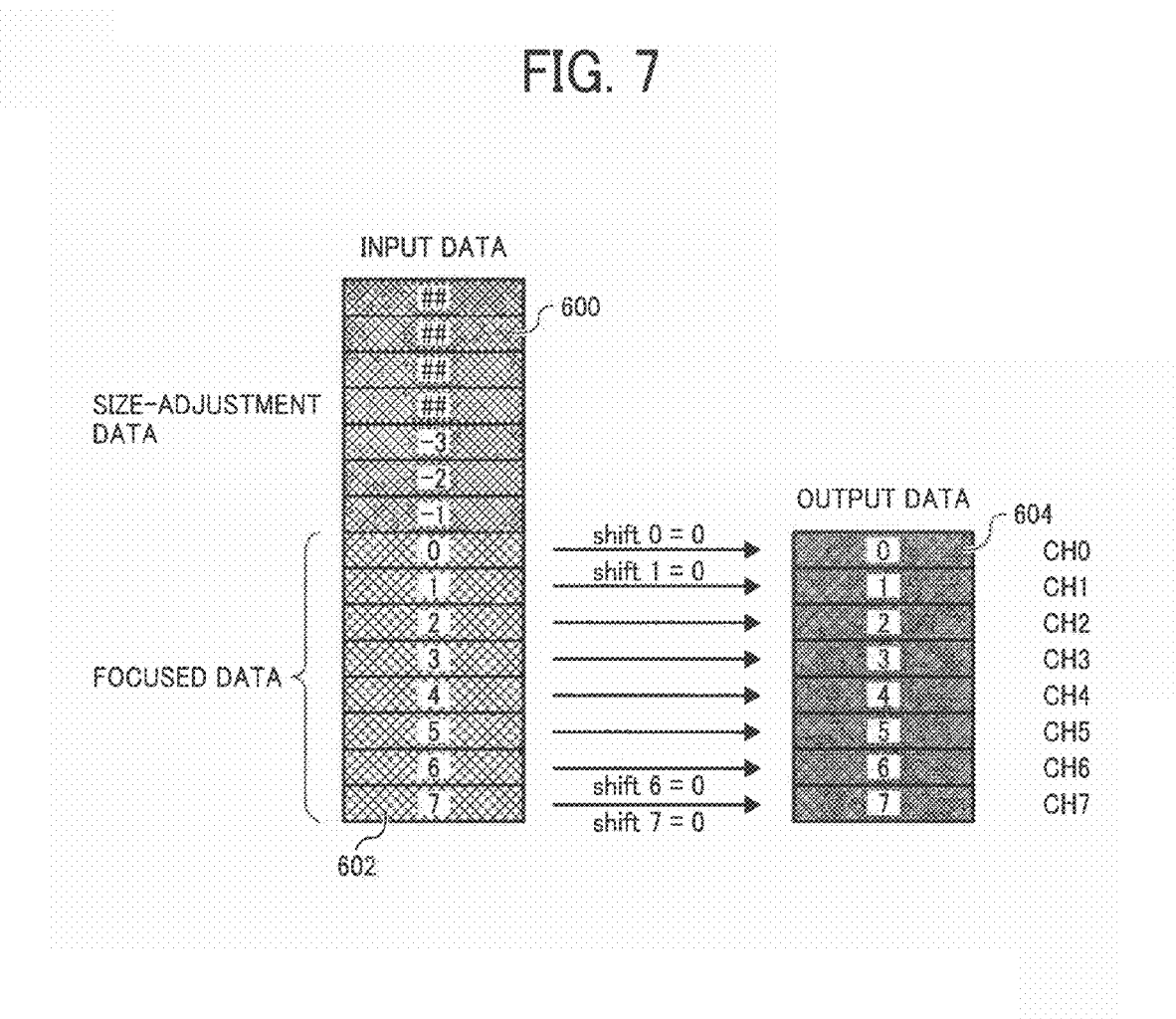

FIG. 13

|    | 0      | 1     | 2     | 3      | 4     | 5     | 6     | 7      | 8     | 9     | 10     |
|----|--------|-------|-------|--------|-------|-------|-------|--------|-------|-------|--------|
| 0  | (0, 0) |       |       |        | (4, 0)|       |       |        | (8, 0)|       |        |
| 1  |        |       |       |        |       |       |       |        |       |       |        |
| 2  |        |       |       |        |       |       |       |        |       |       |        |
| 3  |        |       |       |        |       |       |       |        |       |       |        |
| 4  |        | (1, 4)|       |        |       | (5, 4)|       |        |       | (9, 4)|        |
| 5  |        |       |       |        |       |       |       |        |       |       |        |
| 6  |        |       |       |        |       |       |       |        |       |       |        |
| 7  |        |       |       |        |       |       |       |        |       |       |        |
| 8  |        |       | (2, 8)|        |       |       | (6, 8)|        |       |       | (10, 8)|
| 9  |        |       |       |        |       |       |       |        |       |       |        |
| 10 |        |       |       |        |       |       |       |        |       |       |        |
| 11 |        |       |       |        |       |       |       |        |       |       |        |
| 12 |        |       |       | (3, 12)|       |       |       | (7, 12)|       |       |        |
| 13 |        |       |       |        |       |       |       |        |       |       |        |
| 14 |        |       |       |        |       |       |       |        |       |       |        |
| 15 |        |       |       |        |       |       |       |        |       |       |        |
| 16 | (0, 16)|       |       |        |(4, 16)|       |       |        |(8, 16)|       |        |
| 17 |        |       |       |        |       |       |       |        |       |       |        |
| 18 |        |       |       |        |       |       |       |        |       |       |        |
| 19 |        |       |       |        |       |       |       |        |       |       |        |
| 20 |        |(1, 20)|       |        |       |(5, 20)|       |        |       |(9, 20)|        |
| 21 |        |       |       |        |       |       |       |        |       |       |        |
| 22 |        |       |       |        |       |       |       |        |       |       |        |
| 23 |        |       |       |        |       |       |       |        |       |       |        |
| 24 |        |       |(2, 24)|        |       |       |(6, 24)|        |       |       |(10, 24)|
| 25 |        |       |       |        |       |       |       |        |       |       |        |
| 26 |        |       |       |        |       |       |       |        |       |       |        |
| 27 |        |       |       |        |       |       |       |        |       |       |        |
| 28 |        |       |       |(3, 28) |       |       |       |(7, 28) |       |       |        |
| 29 |        |       |       |        |       |       |       |        |       |       |        |
| 30 |        |       |       |        |       |       |       |        |       |       |        |
| 31 |        |       |       |        |       |       |       |        |       |       |        |
| 32 | (0, 32)|       |       |        |(4, 32)|       |       |        |(8, 32)|       |        |
| 33 |        |       |       |        |       |       |       |        |       |       |        |
| 34 |        |       |       |        |       |       |       |        |       |       |        |
| 35 |        |       |       |        |       |       |       |        |       |       |        |
| 36 |        |       |       |        |       |       |       |        |       |(9, 36)|        |

# METHOD AND APPARATUS FOR PERFORMING IMAGE SIZE ADJUSTMENT

CROSS-REFERENCE TO RELATED APPLICATIONS

The present application claims priority to and incorporates by reference the entire contents of Japanese priority document 2007-235512 filed in Japan on Sep. 11, 2007 and Japanese priority document 2008-211137 filed in Japan on Aug. 19, 2008.

BACKGROUND OF THE INVENTION

1. Field of the Invention

The present invention relates to a technology for forming an image, and more particularly, to a technology for forming a latent image by multibeam exposure.

2. Description of the Related Art

With the functional improvement of image forming apparatuses, proportion of forming images represented by prints per minute (PPM) is increasing. Some image forming apparatuses capable of high-speed and high-quality image forming perform multibeam exposure by using a surface emitting laser such as a vertical-cavity surface emitting laser (VCSEL). Moreover, from the viewpoint of resource saving, more and more duplex-printing models have been provided.

Reflecting such situations, most manufactures try to reduce time between first printing on a front surface of a recording medium and second printing on a back surface of the same recording medium to develop an improved duplex-printing image forming apparatus. There appears a high-speed duplex-printing model that performs both the first printing and the second printing within 10 seconds. However, coupled with size-reduction of the image forming apparatuses, those duplex-printing models have difficulty in cooling. As time between the first printing and the second printing is reduced, the recording medium has to be attached to a high-temperature fixing unit for a longer time. In other words, the recording medium is hard to be cooled down because it is in a high-temperature situation.

When images are printed on both surfaces of the recording medium, for example, a paper sheet with about 80 micrometers in thick in such a difficult-to-cooling situation, a size of an image printed on the back surface is enlarged/reduced than a size of an image printed on the front surface by from 0.2% to 0.4% due to the fluctuation in temperature and humidity.

To solve the above problems, Japanese Patent No. 3373266 discloses a conventional technology for reducing/enlarging image data with respect to the sub-scanning direction by deleting/adding data from/to the image data with respect to the sub-scanning direction.

Although the conventional technology can suppress the size difference, it may form a defective size-adjusted image. The possibility of forming a defective size-adjusted image increases as the quality of image increases. For example, if a size of an image having a plurality of solid straight lines each spaced with five lines is adjusted by adding/deleting a line, a size-adjusted image with a remarkable defect such as uneven density or moiré patterns will be formed.

SUMMARY OF THE INVENTION

It is an object of the present invention to at least partially solve the problems in the conventional technology.

According to an aspect of the present invention, there is provided an image forming apparatus for forming an image from image data formed with a plurality of pixels. The image forming apparatus includes a position deciding unit that decides a correction target position in the image data from a position of a reference pixel in the image data based on size-adjustment proportion; a correcting unit that performs correction with respect to the correction target position; and a size adjusting unit that adjusts a size of the image data by performing sub-scanning direction processing including causing the position deciding unit to sequentially decide positions of a plurality of correction target pixels in one line of pixels along a sub-scanning direction and causing the correcting unit to sequentially perform correction with respect to the correction target positions, and performing main-scanning direction processing including performing the sub-scanning direction processing for all the lines of pixels in the sub-scanning direction, thereby obtaining size-adjusted image data.

According to another aspect of the present invention, there is provided an image forming method for forming an image from image data formed with a plurality of pixels. The image forming method including deciding a correction target position in the image data from a position of a reference pixel in the image data based on size-adjustment proportion; performing correction with respect to the correction target position; and adjusting a size of the image data by performing sub-scanning direction processing including performing the deciding to sequentially decide positions of a plurality of correction target pixels in one line of pixels along a sub-scanning direction and performing the correction to sequentially perform correction with respect to the correction target positions, and performing main-scanning direction processing including performing the sub-scanning direction processing for all the lines of pixels in the sub-scanning direction, thereby obtaining size-adjusted image data.

According to still another aspect of the present invention, there is provided a computer program product that includes a computer program that causes a computer to realize the above image forming method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic diagram for explaining an operation of an image path selector when no image bit is added;

FIG. 13 is a schematic diagram of size-adjusted image data that is obtained by performing the size-adjusting process shown in FIG. 10;

DETAILED DESCRIPTION OF THE PREFERRED EMBODIMENTS

Exemplary embodiments of the present invention are described in detail below with reference to the accompanying drawings.

Figure 1:
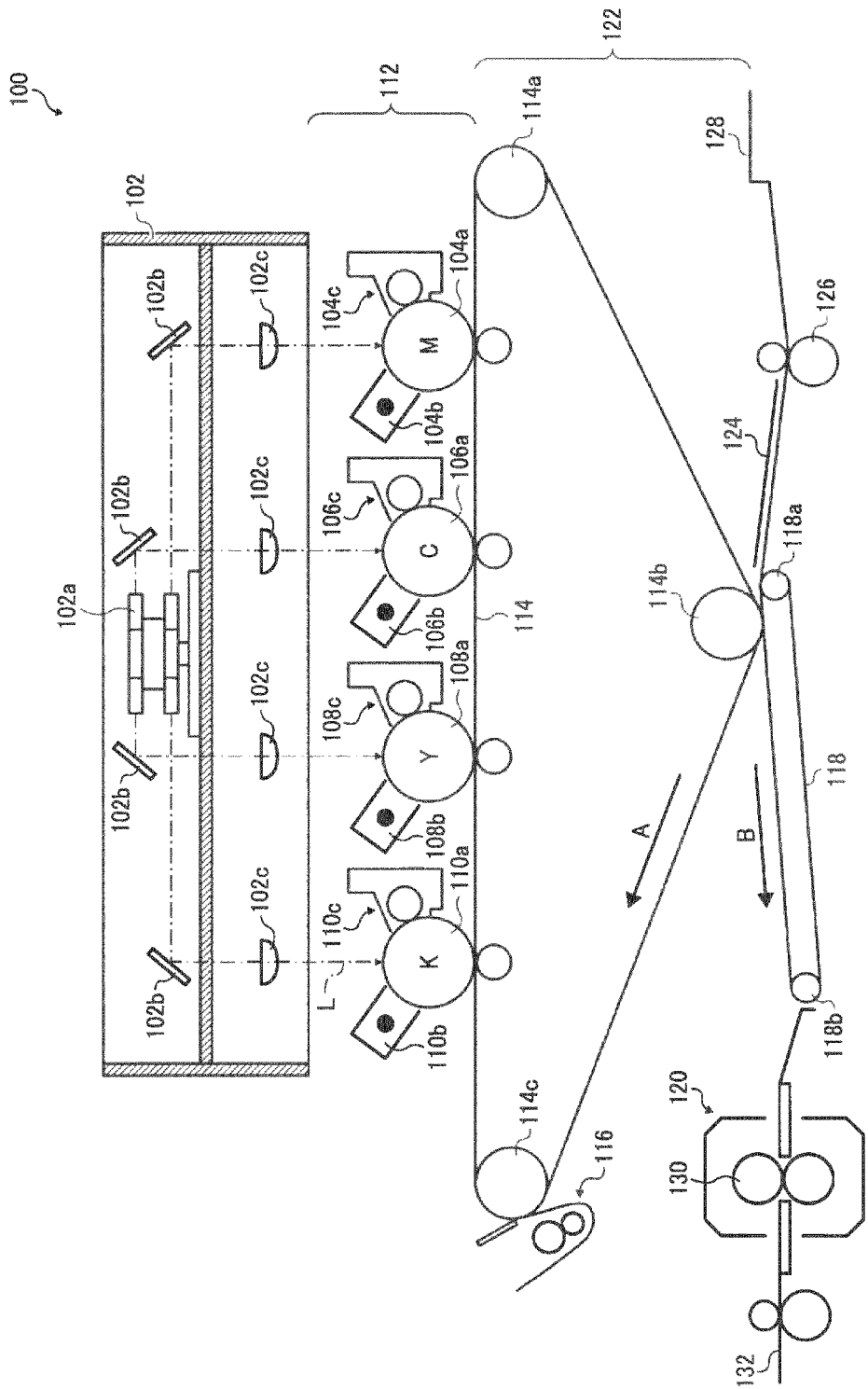
FIG. 1 is a schematic diagram of an image forming apparatus according to an embodiment of the present invention.

FIG. 1 is a schematic diagram of mechanical structure of an image forming apparatus 100 according to an embodiment of the present invention. The image forming apparatus 100 includes an optical device 102, an image forming device 112, and a transferring device 122 including an intermediate transfer belt 114. The optical device 102 includes optical components such as a VCSEL 200 (see FIGS. 2 and 3), a polygon mirror 102a, a first cylindrical lens 202, and a reflection mirrors 102b. The image forming device 112 includes a plurality of photosensitive elements 104a, 106a, 108a, and 110a, a plurality of charging units 104b, 106b, 108b, and 110b, and a plurality of developing units 104c, 106c, 108c, and 110c. As shown in FIG. 1, an optical beam L emitted from the VCSEL 200 is converged by the first cylindrical lens 202, and the converged optical beam L is deflected by the polygon mirror 102a to the reflection mirrors 102b.

Figure 2:
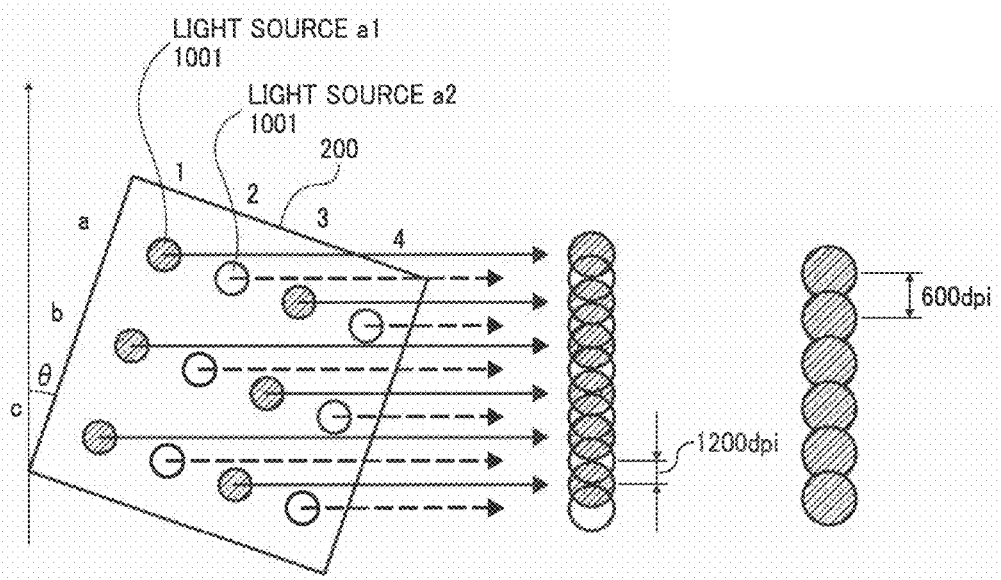
FIG. 2 is a schematic diagram of a VCSEL in an optical device shown in FIG. 1.

The VCSEL 200 is a surface-emitting laser diode including a plurality of light sources (i.e., laser diodes) arranged on a single chip in a grid pattern. There have been known various technologies about an image forming apparatus including such a VCSEL. The VCSEL 200 is a typical VCSEL and is incorporated in the optical device 102. FIG. 2 is a schematic diagram of the VCSEL 200. The VCSEL 200 forms a laser diode array on which a plurality of light sources (laser diodes) 1001 are arranged in a grid pattern. An array direction of the light sources 1001 and a rotation axis of the polygon mirror 102a makes a predetermined angle θ.

In the light sources 1001 shown in FIG. 2, columns are represented by a to c, and rows are represented by 1 to 4. For example, the upper left one of the light sources 1001 is called "light source a1". Because the rows and the rotation axis of the polygon mirror 102a makes the angle θ, a first scanning point exposed with the light source a1 is different from a second scanning point exposed with the light source a2. It is assumed that a pair of the light sources a1 and a2 forms one pixel. If the light sources a1 and a2 makes a pair and the light sources a3 and a4 makes another pair and each pair forms one pixel, pixels shown in the right side of FIG. 2 are formed. If the vertical direction of FIG. 2 is parallel to the sub-scanning direction, a center distance between two pixels each of which is formed by two light sources is 600 dots per inch (dpi). A center distance between the two light sources is 1200 dpi. In other words, a density of light sources is twice as much as a density of pixels. This makes it possible to shift a center of the pixel with respect to the sub-scanning direction by changing a ratio between light quantities of the pair of light sources, which forms a high-quality image.

The optical device 102 is a post-object oriented system without an fθ lens. The optical beam L is generated corresponding to four colors including cyan (C), magenta (M), yellow (Y), and black (K). The optical beam L is reflected by the reflection mirror 102b to a second cylindrical lens 102c. The optical beam L is converged by the second cylindrical lens 102c, and the converged optical beam L reaches one of the photosensitive elements 104a, 106a, 108a, and 110a.

Because exposure with the optical beam L is performed by using the plural optical components, timing synchronization with respect to both the main-scanning direction and the sub-scanning direction is necessary. The main-scanning direction is a scanning direction of the optical beam; and the sub-scanning direction is a direction perpendicular to the main-scanning direction.

Each of the photosensitive elements 104a, 106a, 108a, and 110a includes a conductive drum made of, for example, aluminum and a photoconductive layer that is formed on the conductive drum. The photoconductive layer includes a charge generating layer and a charge transporting layer. The photoconductive layers of the photosensitive elements 104a, 106a, 108a, and 110a are charged by the charging units 104b, 106b, 108b, and 110b, respectively. Each of the charging units 104b, 106b, 108b, and 110b includes a corotron, a scorotoron, and a charging roller.

After applied with static charge, the photoconductive layers of the photosensitive elements 104a, 106a, 108a, and 110a are exposed with the optical beam L, as a result of which electrostatic latent images are formed. The electrostatic latent images are then developed with developers by the developing units 104c, 106c, 108c, and 110c, and thus developed images are formed. Each of the developing units 104c, 106c, 108c, and 110c includes a developing sleeve, a developing roller, and a control blade.

The developers, i.e., C, M, Y, and K developers are transferred from the surfaces of the photosensitive elements 104a, 106a, 108a, and 110a onto the intermediate transfer belt 114 that is rotating in a direction indicted by an arrow A by rotation of conveyer rollers 114a, 114b, and 114c. The C, M, Y, and K developers on the intermediate transfer belt 114 are conveyed to the secondary transfer unit. The secondary transfer unit includes a secondary transfer belt 118 and conveyer rollers 118a and 118b. The secondary transfer belt 118 is rotated in a direction indicated by an arrow B by rotation of the conveyer rollers 118a and 118b. A recording medium 124 such as a paper sheet or a plastic sheet is conveyed from a tray 128 such as a paper cassette to the secondary transfer unit by rotation of a conveyer roller 126.

The secondary transfer unit transfers the developers from the intermediate transfer belt 114 onto the recording medium 124 on the secondary transfer belt 118 by applying secondary transfer bias. The recording medium 124 is then conveyed to a fixing device 120 by rotation of the secondary transfer belt 118. The fixing device 120 includes a fixing roller 130 made of silicon-rubber or fluoro-rubber, and fixes the developers with heat and pressure. The recording medium 124 fixed with the developer is ejected from the image forming apparatus 100 as a printed material 132. After the multi-color developed image is transferred onto the recording medium 124, residual developers are removed from the intermediate transfer belt 114 by a cleaning device 116 including a cleaning blade. Thus, the intermediate transfer belt 114 is ready for a next image forming process.

Figure 3:
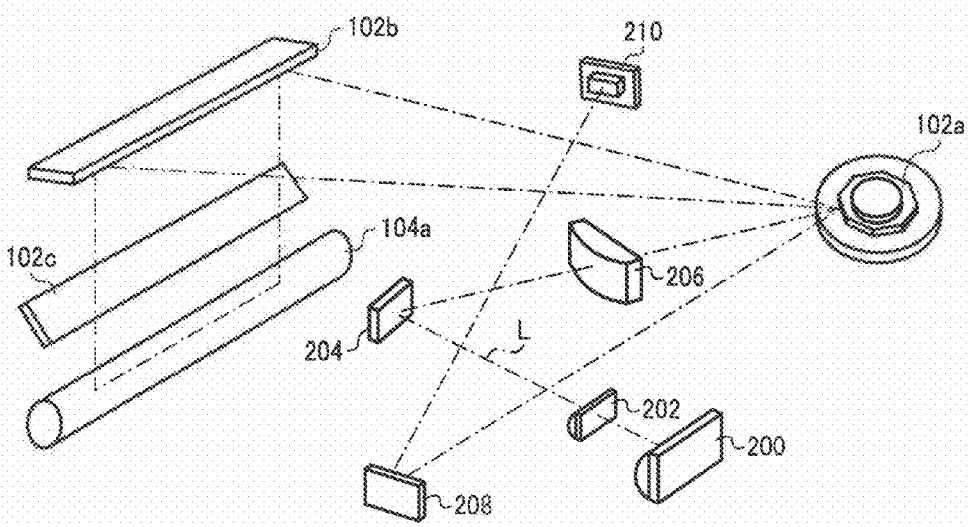
FIG. 3 is a detailed perspective diagram of the optical device including the VCSEL shown in FIG. 1 where a photosensitive element is exposed with an optical beam.

FIG. 3 is a perspective diagram of the optical device 102 including the VCSEL 200 where the photosensitive element 104a is exposed with the optical beam L. The optical beam L is emitted from the VCSEL 200, and is converged by the first cylindrical lens 202. The converged optical beam L passes through a reflection mirror 204 and an imaging lens 206, and reaches the polygon mirror 102a. The optical beam L is then deflected by the polygon mirror 102a. The polygon mirror 102a is rotated by, for example, a spindle motor capable of rotating from several thousands revolutions to several tens of thousands revolutions. The optical beam L is reflected by the polygon mirror 102a to the reflection mirror 102b, and is reflected by the reflection mirror 102b to the second cylindrical lens 102c. After the optical beam L is regulated by the second cylindrical lens 102c, the regulated optical beam L reaches the surface of the photosensitive element 104a.

A reflection mirror 208 is used to synchronize timing of starting a scan in the sub-scanning direction with the optical beam L (hereinafter, "sub-scan"). The reflection mirror 208 reflects the optical beam L to a synchronous detecting device 210 such as a photodiode before the sub-scan starts. Upon detecting the optical beam L, the synchronous detecting device 210 generates a synchronous signal for starting the sub-scan to synchronize processes including a process of generating a drive control signal for driving the VCSEL 200.

The VCSEL 200 is driven by a pulse signal received from a later-described GAVD 310. As described in details later, a position corresponding to a target image bit of image data is exposed with the optical beam L, and thus the electrostatic latent image is formed on the photosensitive element 104a.

Figure 4:
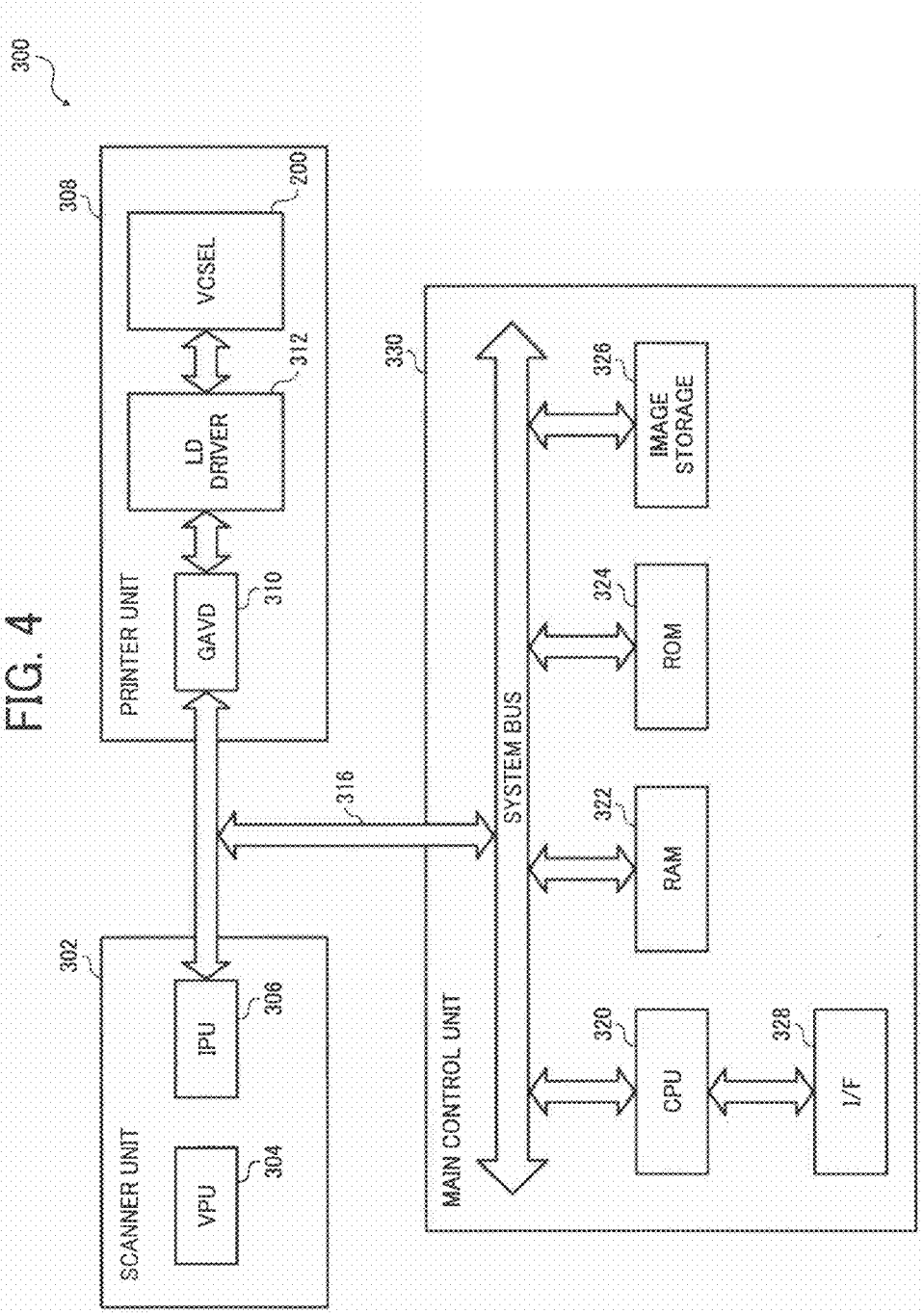
FIG. 4 is a block diagram of a control unit of the image forming apparatus shown in FIG. 1.

FIG. 4 is a block diagram of a control unit 300 of the image forming apparatus 100. The control unit 300 includes a scanner unit 302, a printer unit 308, and a main control unit 330. The scanner unit 302 reads an image from an original. The scanner unit 302 includes a visual processing unit (VPU) 304 and an image processing unit (IPU) 306. The VPU 304 converts the obtained image data from analog data into digital data, and performs various processing such as black-offset correction, shading correction, and pixel-position correction for correcting the converted image data. The IPU 306 converts the obtained image data based on the RGB color-system to image data based on the CMYK color-system. The image data obtained by the scanner unit 302 is sent to the printer unit 308 in a form of digital data.

The printer unit 308 includes the GAVD 310 and a laser diode (LD) driver 312, the VCSEL 200. The GAVD 310 generates the drive control signal, thereby controlling driving of the VCSEL 200. The VCSEL 200 includes a plurality of LD elements that are arranged two-dimensionally. Upon receiving the drive control signal from the GAVD 310, the LD driver 312 supplies an electric current to drive the LD elements of the VCSEL 200. Upon receiving the image data from the scanner unit 302, the GAVD 310 performs a resolution increasing process by dividing pixels of the image data into sub-pixels matched with a beam pitch of the LD elements.

The scanner unit 302 and the printer unit 308 are connected to the main control unit 330 via a system bus 316. The main control unit 330 controls the image reading of the scanner unit 302 and the image forming of the printer unit 308. The main control unit 330 includes a central processing unit (CPU) 320, a random access memory (RAM) 322 as a working area for the CPU 320, a read only memory (ROM) 324, an image storage 326, and an interface (I/F) 328. Any well-known CPUs can be used as the CPU 320, for example, a PENTIUM (registered trademark) series CPU, a CPU compatible with the PENTIUM series CPU, or a reduced instruction set computer (RISC) such as microprocessor without interlocked pipeline stages (MIPS). The CPU 320 receives a command from a user via the I/F 328, calls a computer program module for performing a process corresponding to the received command, and performs the corresponding process such as copy, facsimile, scan, or image storage. The ROM 324 stores therein default setting data, control data, and computer programs in a form executable by the CPU 320. The image storage 326 is a built-in or detachable memory device such as a hard disk device, a secure digital (SD) memory card, and a universal serial bus (USB) memory. The image storage 326 stores therein the image data obtained by the image forming apparatus 100 so that the stored data is used for various processing to satisfy user's requests.

Figure 10:
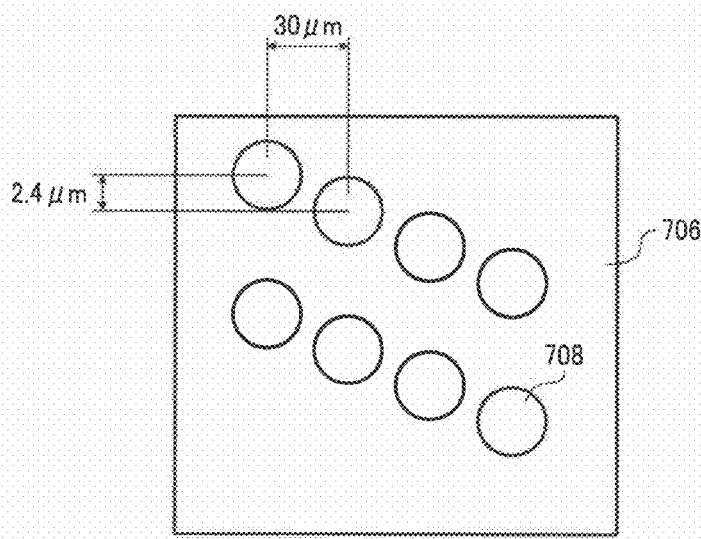
FIG. 10 is a schematic diagram of a plurality of laser spots in a pixel area.

When the printer unit 308 forms the electrostatic latent image on the photosensitive element 104a based on the image data acquired by the scanner unit 302, the CPU 320 performs positional control in both the main-scanning direction and the sub-scanning direction for correcting a position of the recording medium. The CPU 320 sends a start signal to the GAVD 310 to start the sub-scan. When the GAVD 310 receives the start signal, the IPU 306 starts the sub-scan. After that, the GAVD 310 acquires the image data from a storage unit such as a buffer memory, processes the acquired image data, and sends the processed image data to the LD driver 312. Upon receiving the processed image data from GAVD 310, the LD driver 312 generates the drive control signal for driving the VCSEL 200, and sends the generated drive control signal to the VCSEL 200. Upon receiving the drive control signal, the VCSEL 200 lightens up. The LD driver 312 drives the LD elements based on, for example, a pulse-width modulation control. Although the LD elements equivalent to eight channels are shown in FIG. 10, the number of channels is not limited to eight.

Figure 5:
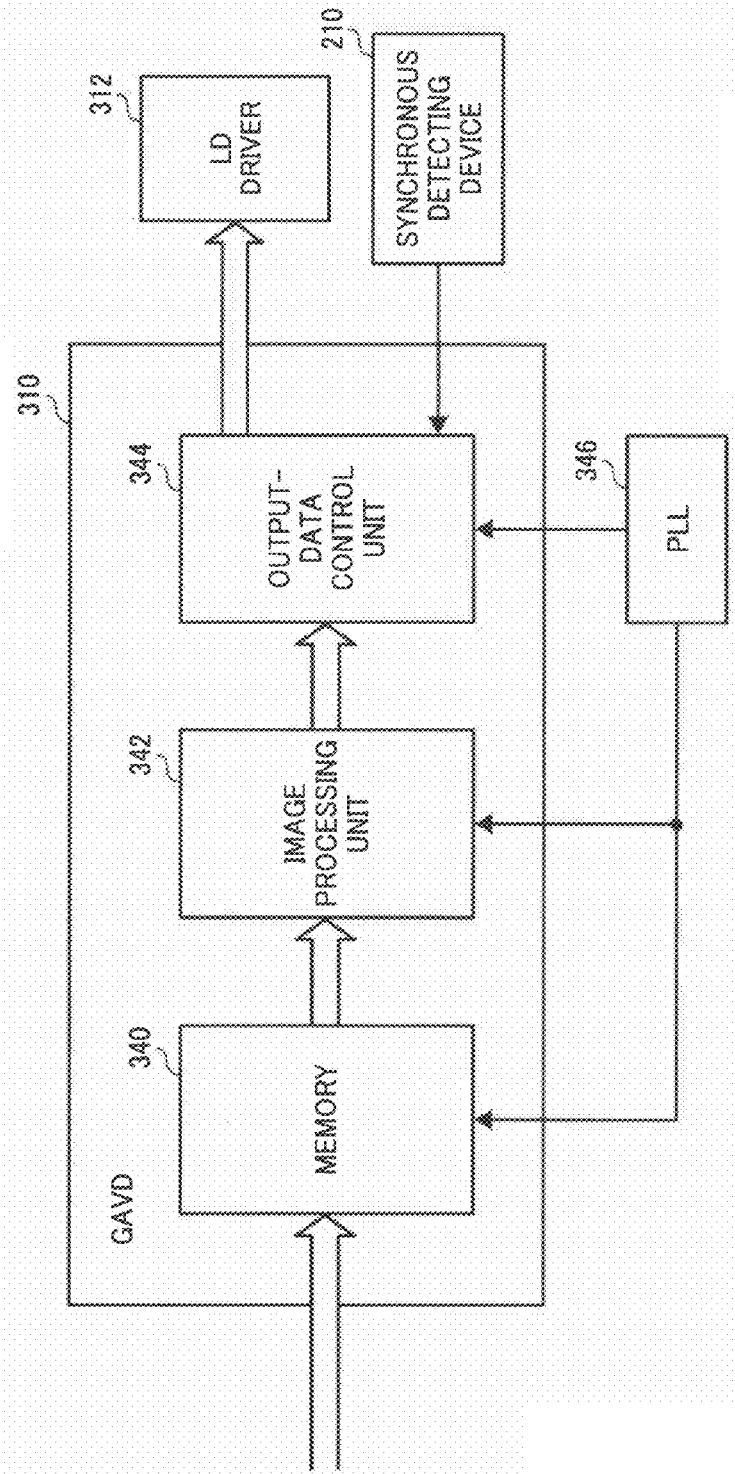
FIG. 5 is a detailed block diagram of a GAVD shown in FIG. 4.

FIG. 5 is a detailed block diagram of the GAVD 310. The GAVD 310 includes a memory 340, an image processing unit 342, and an output-data control unit 344. The memory 340 is, for example, a first-in first-out (FIFO) buffer. The GAVD 310 stores the image data received from the IPU 306 in the memory 340. Upon receiving the synchronous signal, the GAVD 310 sends the stored image data to the image processing unit 342 in the FIFO order. The image processing unit 342 reads the image data from the memory 340, and performs various processing as resolution adjustment, channel assignment, and image-bit addition/deletion (i.e., a process of adjusting a size of the image data by adding/deleting correction pixels to/from the image data). In the image data, a position on the photosensitive element 104a to be exposed is defined by a main-scanning line address value indicative of a position with respect to the main-scanning direction (hereinafter, "R address value") and a sub-scanning line value indicative of a position with respect to the sub-scanning direction (hereinafter, "F address value"). Address coordinates are defined, hereinafter, as a set of address values specified by the R address values and the F address values where specific image bits are to be positioned. The specific address values are decided by an address generating unit 354 as described later. The address coordinates are defined based on each main-scanning line or each sub-scanning line (i.e., line of pixels). A later-described image path selector 358 performs a correction process of, for example, inserting bits to a pixel positioned on the address coordinates (i.e., pixel positions) specified by the R address value and the F address value specified by the address generating unit 354.

The output-data control unit 344 generates output data as a writing signal corresponding to the image data generated by the image processing unit 342 by converting the image data into a time-series drive pulse based on the F address values and the sub-scanning speed and adding a synchronous control signal for providing the synchronous detecting device 210 with the synchronous signal. The generated drive control signal is sent to the LD driver 312, and drives the VCSEL 200. The output-data control unit 344 receives the synchronous signal from the synchronous detecting device 210, and thereby synchronizes sending of the drive control signal to the LD driver 312 with the synchronous signal. The operations of the memory 340, the image processing unit 342, and the output-data control unit 344 are synchronized with an operation clock by a phase-lock loop (PLL) 346.

Figure 6:
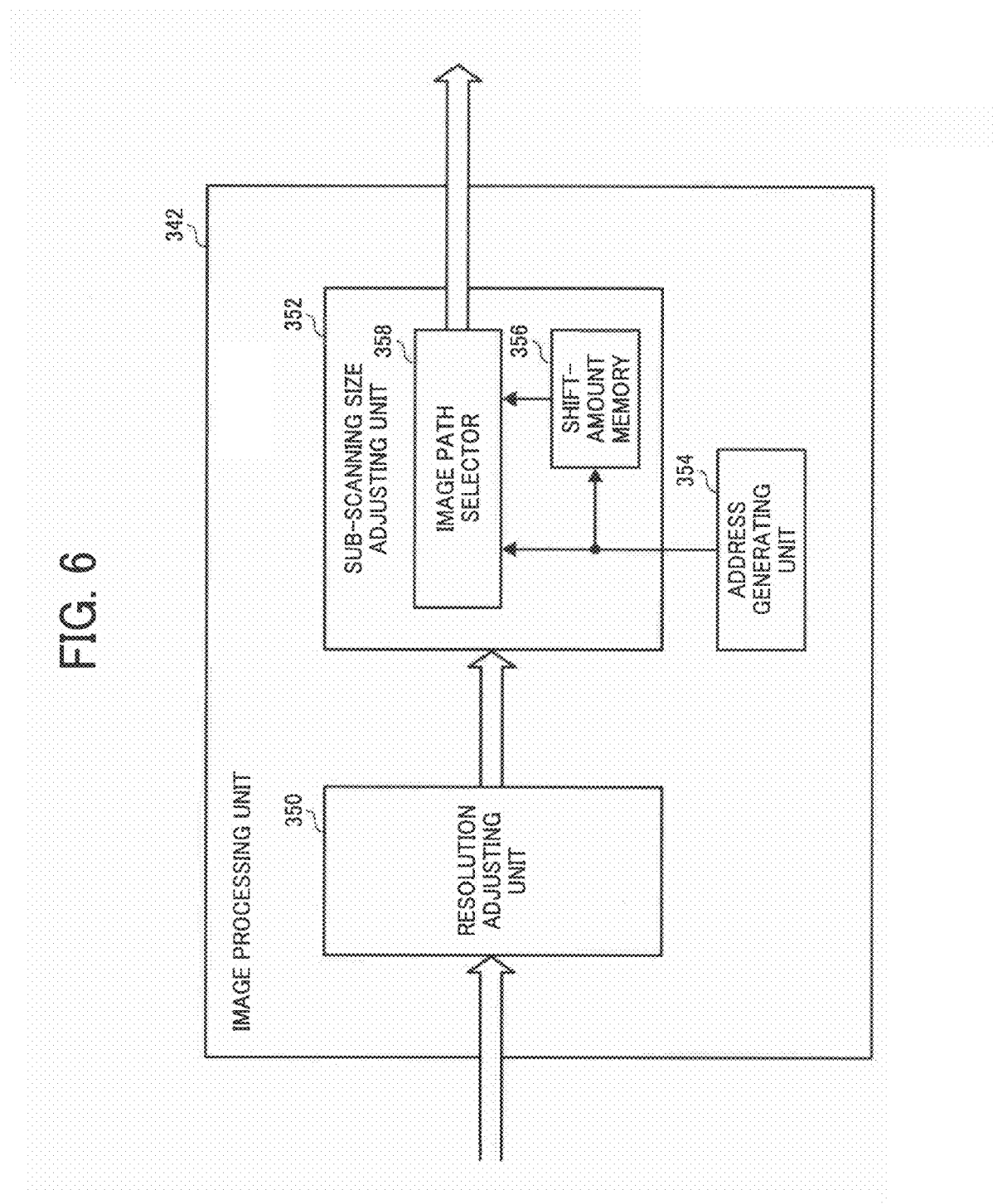
FIG. 6 is a detailed block diagram of an image processing unit shown in FIG. 5.

FIG. 6 is a detailed block diagram of the image processing unit 342. The image processing unit 342 includes a resolution adjusting unit 350, a sub-scanning size adjusting unit 352, and the address generating unit 354. The resolution adjusting unit 350 divides pixels of the image data that is acquired from the memory 340 into sub-pixels depending on the number and the size of channels of the VCSEL 200. The resolution adjusting unit 350 assigns the sub-pixel to one of the channels so that the corresponding LD element emits a light beam for the sub-pixel. If it is required to increase the resolution, the resolution adjusting unit 350 selects either a 2n-time density process (n is a positive integer) or 2n-line process, and performs assignment of the LD-element channels to be driven.

The sub-scanning size adjusting unit 352 includes the image path selector 358 and a shift-amount memory 356. The sub-scanning size adjusting unit 352 receives the F address and the R address from the address generating unit 354, and determines whether target address values includes an address of an image bit to be added/deleted. The sub-scanning size adjusting unit 352 generates a size-adjustment command signal for the address of an image bit to be added/deleted, that is, for example, sets an add flag or a delete flag ON, and sends the size-adjustment command signal to the image path selector 358 and the shift-amount memory 356. The shift-amount memory 356 stores therein a shift amount by which an image bit is to be shifted. The shift-amount memory 356 counts and stores herein the size-adjustment command signal. If the add flag is set as the size-adjustment command signal to enlarge the size of image, the image path selector 358 sets the image bit to white data and shifts subsequent image data by one bit. If no size-adjustment command signal is set, the image path selector 358 selects input data from the resolution adjusting unit 350 based on the shift amount acquired from the shift-amount memory 356, and outputs the selected input data. Because the VCSEL 200 is an 8-ch VCSEL in the present embodiment, the signal indicative of a position of an image bit to be added/deleted and the signal indicative of the shift amount are assigned to eight channels, and those signals are used to drive the VCSEL 200. Calculation of image-bit addition/deletion can be implemented as a dedicated module executed by any functional unit of the image processing unit 342 or can be implemented as a part of another module. The reason of counting the size-adjustment command signal is to specify, if an image bit is added at a first scanning, a position of a first image bit to be added at a second scanning.

The operations of the image path selector 358 are described below with reference to FIGS. 7 and 8A to 8C. Each piece of focused data 602 represents a bit value for one pixel, and is represented by the F address corresponding to one of eight channels. The focused data 602 is bit data assigned to the same R address. The focused data 602 and size-adjustment data indicative of a shift amount in the sub-scanning direction are read from the memory 340 as input data 600, and all lines of data processed in the same manner is input to the resolution adjusting unit 350. In a case shown in FIG. 7 where the size of image data is not changed, the size-adjustment command signal is not set, i.e., the shift amount acquired from the shift-amount memory 356 is set to zero. Thus, the focused data 602 is output as output data 604 (i.e., writing signal).

Figure 8C:
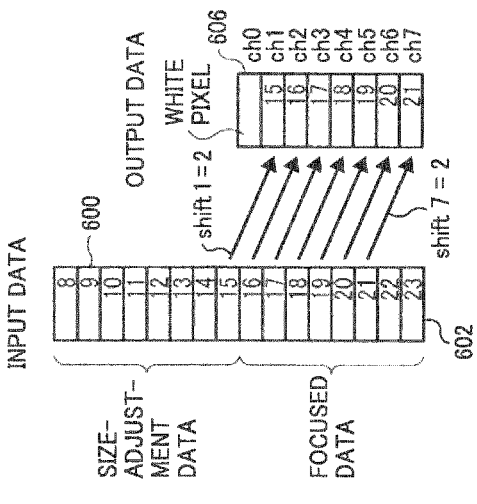
FIGS. 8A to 8C are schematic diagrams for explaining operations (first scanning to third scanning) of the image path selector when image bits are added.

The operations of the image path selector 358 when the size-adjustment signal is set are described below with reference to FIGS. 8A to 8C. Assuming that a white pixel is added to the F address of 1 of the focused data 602 at a first scanning shown in FIG. 8A. The size-adjustment signal indicative of the addition of an image bit is set to an address value corresponding to a channel 1. Therefore, bit data for the channel 1 is replaced with a white pixel, and the replaced bit data is set as data in the channel 1 of the output data 606. The count value 1 corresponding to addition of data for the channel 1 is stored in the shift-amount memory 356.

Each piece of data for the channels 2 to 7 is shifted by the shift amount of −1 to a new F address as the output data 606. The image path selector 358 assigns the channels 2 to 7 of the output data 606 to bit data in the focused data 602 at a channel corresponding to the shift amount of −1, thereby adding the image bit. As a result, the output data 606 including the white bit and the focused data 602 is formed, and the output data 606 is used as the writing signal. The output-data control unit 344 converts the writing signal to the time-series signal, thereby generating the drive pulse for driving the VCSEL 200. Thus, the image forming is performed. The above process is performed based on each sub-scanning line. When pixel data in a first sub-scanning line is processed, pixel data in a second sub-scanning line is read from the memory 340, and thus the output data is formed.

Figure 8B:
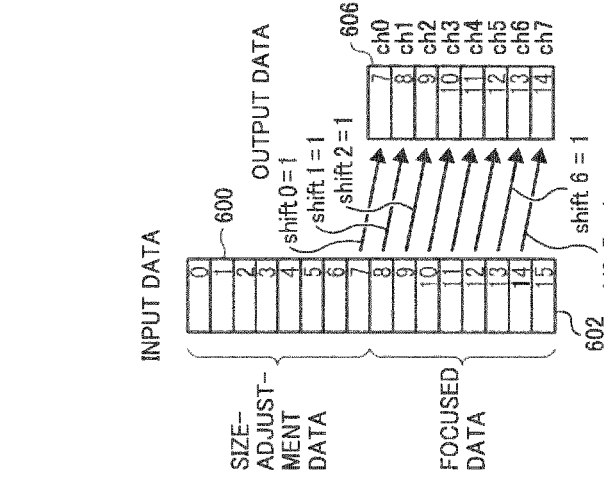
Figure 8A:
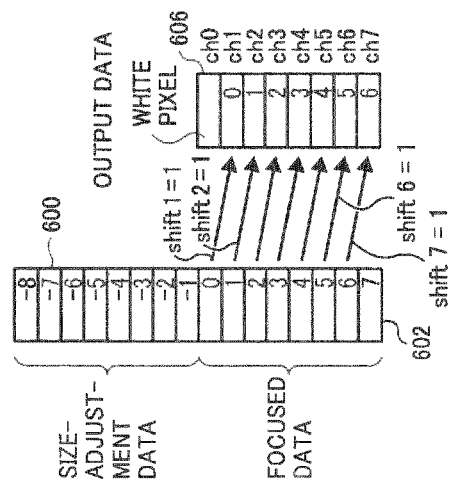

Following the first scanning in which the white pixel is added to the output data 606 and the sub-coordinates values in the channels 1 to 7 of the output data 606 are shifted, the sub-coordinates values in the channels 8 to 15 of the output data 606 are shifted by −1 even if no white pixel is added at a second scanning as shown in FIG. 8B. If a white pixel is added at a third scanning in a similar manner as at the first scanning, the sub-coordinates values in the channels 16 to 23 of the output data 606 are shifted by −2 at the third scanning as shown in FIG. 8C.

Figure 9:
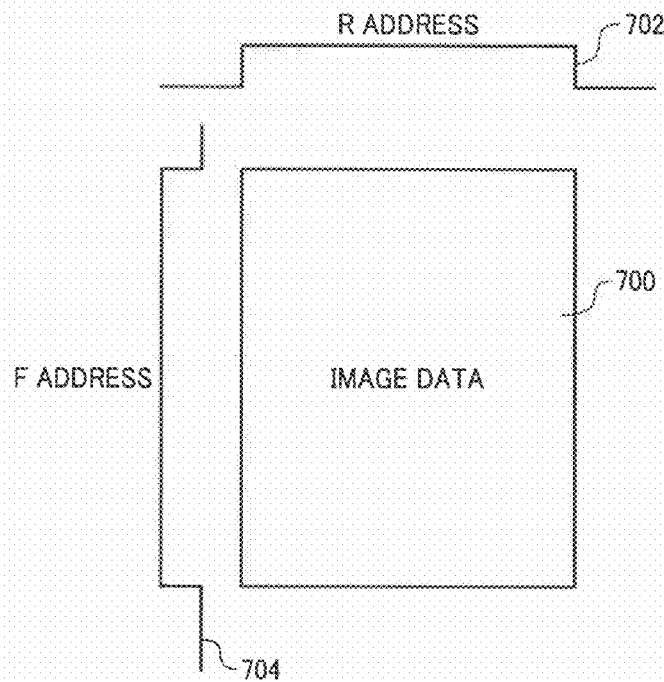
FIG. 9 is a schematic diagram of an R address and an F address in the image data.

FIG. 9 is a schematic diagram of the R address and the F address in the image data. An R address 702 indicates a position of a pixel with respect to the main-scanning direction in image data 700. The R address is within a range corresponding to a writable area of the recording medium 124 in the feeding direction. An F address 704 indicates a position of a pixel with respect to the sub-scanning direction in the image data 700. The feeding in the main-scanning direction and control of turning on the VCSEL 200 are performed based on the R and F addresses. Thereafter, the photosensitive element is scanned with the optical beam L, and then the size-adjusted electrostatic latent image is formed on the photosensitive element.

FIG. 10 is a schematic diagram of a plurality of laser spots 708 for exposing a pixel area 706. The VCSEL 200 in the present embodiment includes the 8-ch LD elements. The laser spots 708 of the LD elements form two lines. Each line includes 4-ch laser spots each of which shifts to a position 2.4 micrometers in the sub-scanning direction and 30 micrometers in the main-scanning direction away from the preceding laser spot. In other words, the laser spots 708 divide the pixel area 706 into four sections in the sub-scanning direction and four sections in the main-scanning, thereby obtaining the resolution corresponding to 16 sections per pixel. In the example shown in FIG. 10, the laser modulation pitch (i.e., beam pitch) in the sub-scanning direction is one-fourth of the resolution of the image data obtained through scanning. More particularly, if the input resolution of a pixel is 1200 dpi, the electrostatic latent image can be formed with the beam pitch of 4800 dpi as a practical resolution.

FIG. 9 is a schematic diagram for explaining the resolution increasing process performed by the resolution adjusting unit 350. The resolution adjusting unit 350 performs a so-called 4-time density process with respect to the main-scanning direction and the sub-scanning direction as the resolution increasing process by converting image data 808 including one piece of 2-bit pixel data 800 with the input resolution of 1200 dpi into image data 808A including 16 pieces of 1-bit sub-pixel data 802 with the output resolution of 4800 dpi. Each piece of the sub-pixel data 802 is assigned to one of channels of the LD elements, and is used to generate the drive control signal.

Although the resolution adjusting unit 350 performs the resolution increasing process by converting the image data 808 including the 2-bit pixel data 800 with the input resolution of 1200 dpi into the image data 808A in the present embodiment, the resolution adjusting unit 350 can perform the resolution increasing process in another manner. For example, the resolution adjusting unit 350 can convert the 2-bit image data 808 with the input resolution of 1200 dpi into image data 808B including sub-pixel data 804.

The sub-pixel data 804 is 1-bit data with the resolution of 1200 dpi in the main-scanning direction and 4800 dpi in the sub-scanning direction, forming 4 lines with 1200 dpi×4 bit. If the resolution adjusting unit 350 converts the image data 808 into the image data 808B, each piece of the sub-pixel data 804 is assigned to one of channels of the LD elements, and is used to generate the drive control signal. Both of the resolution increasing process of obtaining the image data 808A (hereinafter, "first resolution increasing process") and the resolution increasing process of obtaining the image data 808B (hereinafter, "second resolution increasing process") are effective to recover general defects in the image such as moiré patterns or jugged edges in the sub-scanning direction. The second resolution increasing process is especially effective from viewpoint of workload saving, because the number of sub-pixels is one-fourth of the number of sub-pixels generated in the first resolution increasing process.

Figure 12:
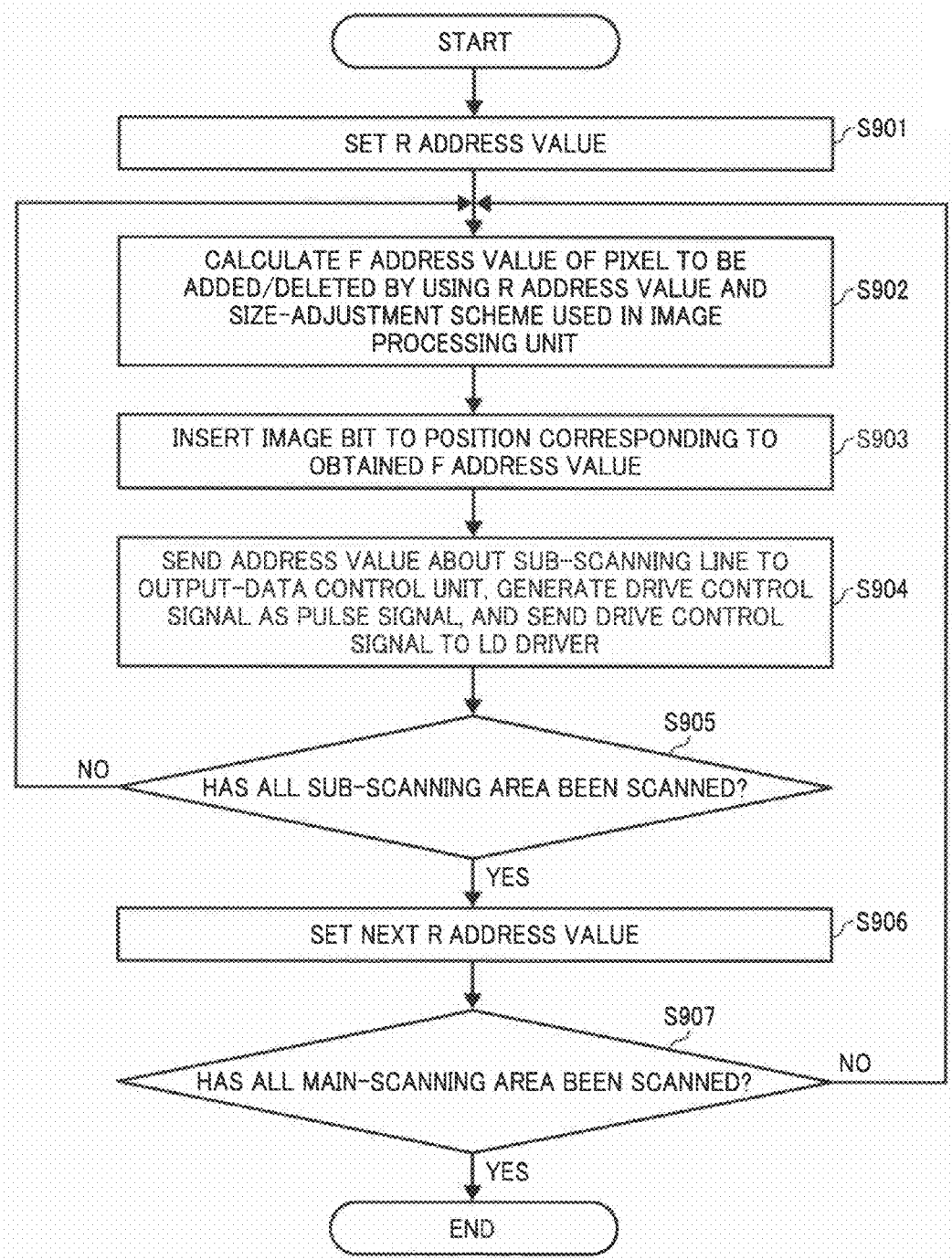
FIG. 12 is a flowchart of a size-adjusting process performed by the image forming apparatus.

FIG. 12 is a flowchart of a size-adjusting process performed by the image forming apparatus 100. The address generating unit 354 sets the R address value (Step S901). The address generating unit 354 calculates the F address value of a pixel to be added or deleted by using the R address and the size-adjusting scheme used in the image processing unit 342 (Step S902).

The image path selector 358 performs a write-over by adding or deleting the R address value and the F address values subsequent to the calculated F address by one line, and inserts the image bit to a pixel at the address (the R address value and the F address value) on the sub-scanning line corresponding to the calculated F address (Step S903). In other words, the image path selector 358 performs the correction process for the pixel located at the address represented by the R address value and the F address value. When a sub-scanning line is added, the subsequent F address values can be changed in another manner instead of written over in the descending order. For example, as taking the two sub-scanning line between which a sub-scanning line to be inserted are taken as indices, an F address value of the sub-scanning line to be inserted is generated independently, and the generated F address value is sent to the output-data control unit 344.

The image path selector 358 reads bit data corresponding to the target F address area, and sends the obtained bit data to the output-data control unit 344 (Step S904). The output-data control unit 344 generates the timing pulse signal corresponding to the position of the pixel, and sends the pulse signal to the LD driver 312, thereby driving the LD elements.

Although it is possible to assign a value equivalent to 1200 dpi for every line at Step S903, an F address value equivalent to 4800 dpi, i.e., resolution capability of the VCSEL 200 in the sub-scanning direction to the F address. In this manner, because the LD elements of the VCSEL 200 are controlled on the 4800-dpi level, the image forming apparatus 100 can perform the finer size-adjusting control.

The image path selector 358 determines whether all pixel data corresponding to the default F address area that is assigned with 1200 dpi has been sent based on a result of comparison between the F address values or notification that an end of character bit has been received, (Step S905). If all sub-scanning area has been scanned (Yes at Step S905), the address generating unit 354 sets the next R address value (Step S906). After that, the sub-scanning size adjusting unit 352 determines whether all main-scanning area has been scanned (Step S907). If all main-scanning area has not been scanned (No at Step S907), the process control goes to Step S902 and Steps S902 to S907 are repeated.

If all sub-scanning area has not bee scanned (No at Step S905), the process control goes to Step S902, and Steps S902 to S907 are repeated until all sub-scanning area has been scanned. If all main-scanning area has been scanned (Yes at Step S907), the process control goes to end.

Figure 14:
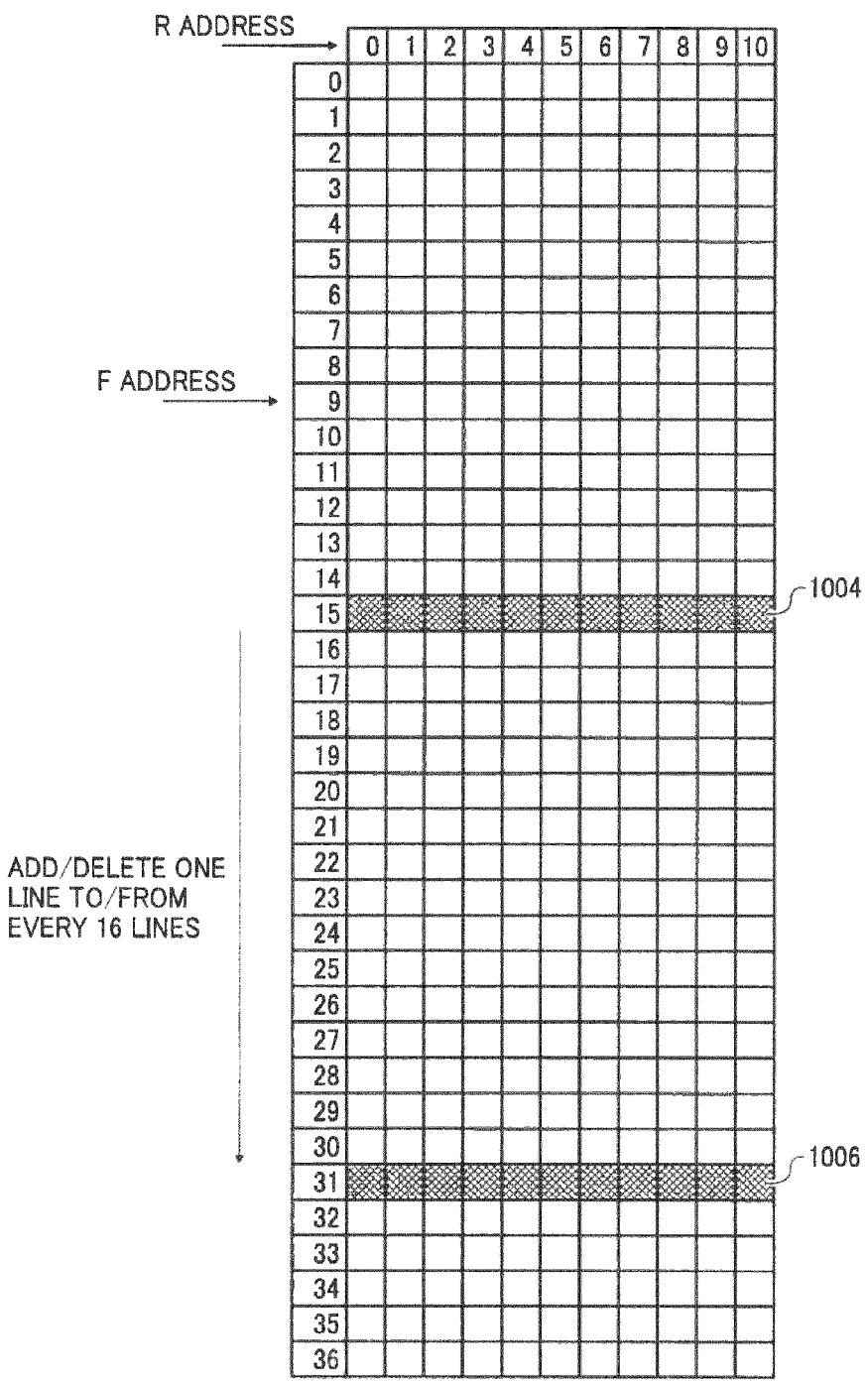
FIG. 14 is a schematic diagram of size-adjusted image data that is obtained by performing a conventional size-adjusting process of adding a sub-scanning line as a whole.

The size-adjusting process of adjusting a size of image data by adding/deleting an image bit at Step S903 shown in FIG. 12 is described below with reference to FIGS. 13 and 14. Assume here that a line is inserted to the image data. FIG. 13 is a schematic diagram for explaining the size-adjusting process according to the present embodiment. FIG. 14 is a schematic diagram for explaining a conventional size-adjusting process of adding a sub-scanning line as a whole. In the example shown in FIG. 13, the image data is enlarged by 6.25% in the sub-scanning direction. More particularly, one line is added to every 16 sub-scanning lines with 1200 dpi. In the conventional size-adjusting process, one sub-scanning line is cyclically inserted to every 16 lines at the same F address value, and thus sub-scanning lines 1004 and 1006 are inserted as shown in FIG. 14. As a result, a size-adjusted image having general defects such as moiré patterns is formed.

In contrast as shown in FIG. 14, the image forming apparatus 100 calculates by using a cycle-N scheme the address values of the image bits to be inserted to image data 1000, and adds the image bits. The address values of the image bits to be added in predetermined sub-scanning lines are expressed in a form of (main-scanning address, sub-scanning address)=(x, y), and inserted image bits 1002 are shown in FIG. 13.

Figure 11:
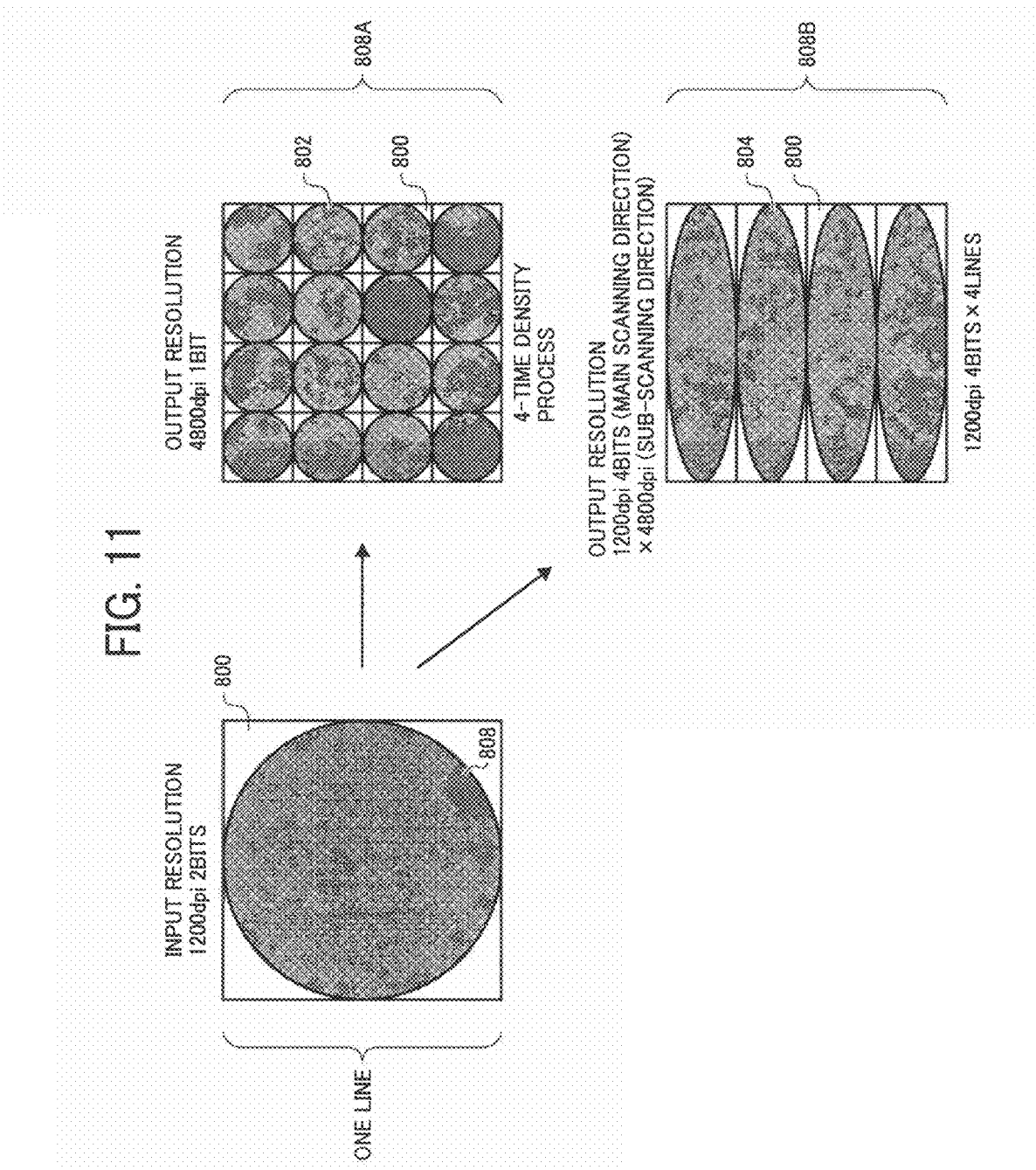
FIG. 11 is a schematic diagram of image data with a 4-time resolution in both the main-scanning direction and the sub-scanning direction and image data with a 4-time resolution in the sub-scanning direction.

The image bit can be added based on the sub-pixels, shown in FIG. 11 instead of the pixels with the input resolution of 1200 dpi. In the cycle-N scheme, to soften visually odd feeling by evenly scattering the image bits, the image bits are inserted to pixels at different positions away from each other as far as possible. For example, if one line is added for every L number of sub-scanning lines, an enlargement proportion of $\{(1+1/L)\times100\}\%$ is obtained.

Assuming that an offset value P is an offset of an image bit shifted in the sub-scanning direction, a first address value is an address value of a first image bit in a first main-scanning line, and a second address value is an address value of a second image bit to be inserted to a second main-scanning line next to the first main-scanning line, a distance D1 between the first address value and the second address value is calculated by Equation (1):

$$D1 = \mathrm{sqrt}(P^2 + 1^2) \qquad (1)$$

As shown in Equation (1), the distance D1 basically increases as the offset value P increases. It is sure that if P is smaller than a square root of L, which is a component of D1 in the sub-scanning direction, the distance D1 increases as the offset value P increases. If 2×P is larger than L, there is a third image bit at a position, when assuming that the first image bit is on a first sub-scanning line, with the same R address on a third sub-scanning line.

A distance D2 between the first address value and the third address value of the third image bit is calculated by Equation (2):

$$D2 = \mathrm{sqrt}(O^2 + 2^2) \qquad (2)$$

If the distance D1 is not equal to the distance D2, an uneven image is formed because the image bits are not evenly scattered.

However, the image forming apparatus 100 inserts the image bits in such a manner that the distance D1 agrees with the distance D2. Thus, the image bits are evenly scattered and therefore an even image is formed. More particularly, the address generating unit 354 calculates the square root of L, which is the distance component in the sub-scanning direction within L number of sub-scanning lines, so that the distance D1 agrees with the distance D2. The address generating unit 354 then selects an integer N closest to the square root of L, and calculates the F address of the image bit to be inserted from the R address and the interfere N by using Equation (3):

$$F\text{ address value} = N \times \mathrm{Mod}_N(R\text{ address value}) + L \qquad (3)$$

This calculation method is called "cycle-N scheme" in the following explanation.

If it is required to add/delete the image pixels to/from smaller pixels, the image forming apparatus 100 uses a sub-pixel based magnification by dividing a pixel into sub-pixels based on the number of LD elements of the VCSEL 200. The sub-pixel based magnification is obtained through the resolution increasing process performed by the resolution adjusting unit 350. Assuming that four beams are assigned to one pixel, if line addition operations with the 4-time resolution, i.e., based on the sub-pixels are performed four times as many as the line adding operation with the normal resolution, the equivalent enlargement/reduction ratio is obtained. The ModN is an operator for calculating a residue class of N. Assuming that the enlargement ratio is 16:1, L is 16, N is 4, and the F address value of the image bit is cyclically reset at every residue of the R address value, i.e., 0, 1, 2, and 3. In this case, the offset value P between adjacent R address lines (i.e., shift amount between the F address values) is 4. Taking the sub-scanning direction resolution of the VCSEL 200 into consideration, the image forming apparatus 100 can perform the high-quality size-adjusting process by increasing the resolution, for example, from 1200 dpi to 4800 dpi. In the high-quality size-adjusting process, a process for 16×4=64 lines is equivalent to a process of inserting one line with the input resolution of 1200 dpi.

The image data with the input resolution of 1200 dpi is converted, by the insertion process with respect to the resolution both the main-scanning direction and the sub-scanning direction, into the image data 808A shown in FIG. 11 with the output resolution of 4800 dpi in each of the main-scanning direction and the sub-scanning direction. Alternatively, the image data with the input resolution of 1200 dpi is converted into the image data 808B shown in FIG. 11 with the output resolution of 1200 dpi in the main-scanning direction and 4800 dpi in the sub-scanning direction.

FIG. 13 is a schematic diagram of image data a size of which is adjusted with the magnification of 16:1 by inserting the image bits to the positions calculated by using Equation (3). In the cycle-N insertion as shown in FIG. 13, the image bits are inserted in positions with various F addresses, the image bits are arranged in a cyclic pattern with a long interval between the image bits. The address of image bit to be inserted is represented by (R address value, F address value) in FIG. 13.

Even if N is not an integer, although the accuracy of enlargement/reduction ratio decreases, it is possible to adjust the size of image data without causing the general defects in the same manner as described in the above process.

Equations (1) to (3) are described based on the image data 808A in which the resolution in the main-scanning direction is equal to the resolution in the sub-scanning direction. However, it is possible to adjust a size of the image data 808B in which the resolution in the main-scanning direction is different from the resolution in the sub-scanning direction in the same manner as adjusting a size of the image data 808A, because the size-adjustment proportion is not changed. To adjust a size of the image data 808B, the offset value P is calculated by following Equation (4):

$$(V/H)P^2 = L$$

$$P = \mathrm{sqr}(H/V) \qquad (4)$$

where V is resolution in the sub-scanning direction, and H is resolution in the main-scanning direction. The cycle-N size-adjusting process can be performed by calculating the offset value P from the ratio between the resolution in the main-scanning direction and the resolution in the sub-scanning direction.

For example, if the resolution in the main-scanning direction is 1200 dpi, the resolution in the sub-scanning direction is 4800 dpi, and N is 4, then P is 2. Thus, in the size-adjusting process, an image bit is added to a pixel at a position shifted by 2 pixels in the main-scanning direction and 8 pixels in the sub-scanning direction.

If a size of the image data having the resolution in the main-scanning direction different from the resolution in the sub-scanning direction is adjusted in the size-adjusting process, image data in which an interval between the image bits in the main-scanning direction is different from an interval between the image bits in the sub-scanning direction is formed, although if a size of the image data having the resolution in the main-scanning direction same as the resolution in the sub-scanning direction is adjusted, the intervals in the main-scanning direction and the sub-scanning direction are same. However, because the interval in the main-scanning direction and the interval in the sub-scanning direction are constant among the image bits, the resultant image data is not degraded, i.e., an even image without moiré patterns is obtained.

Figure 15:
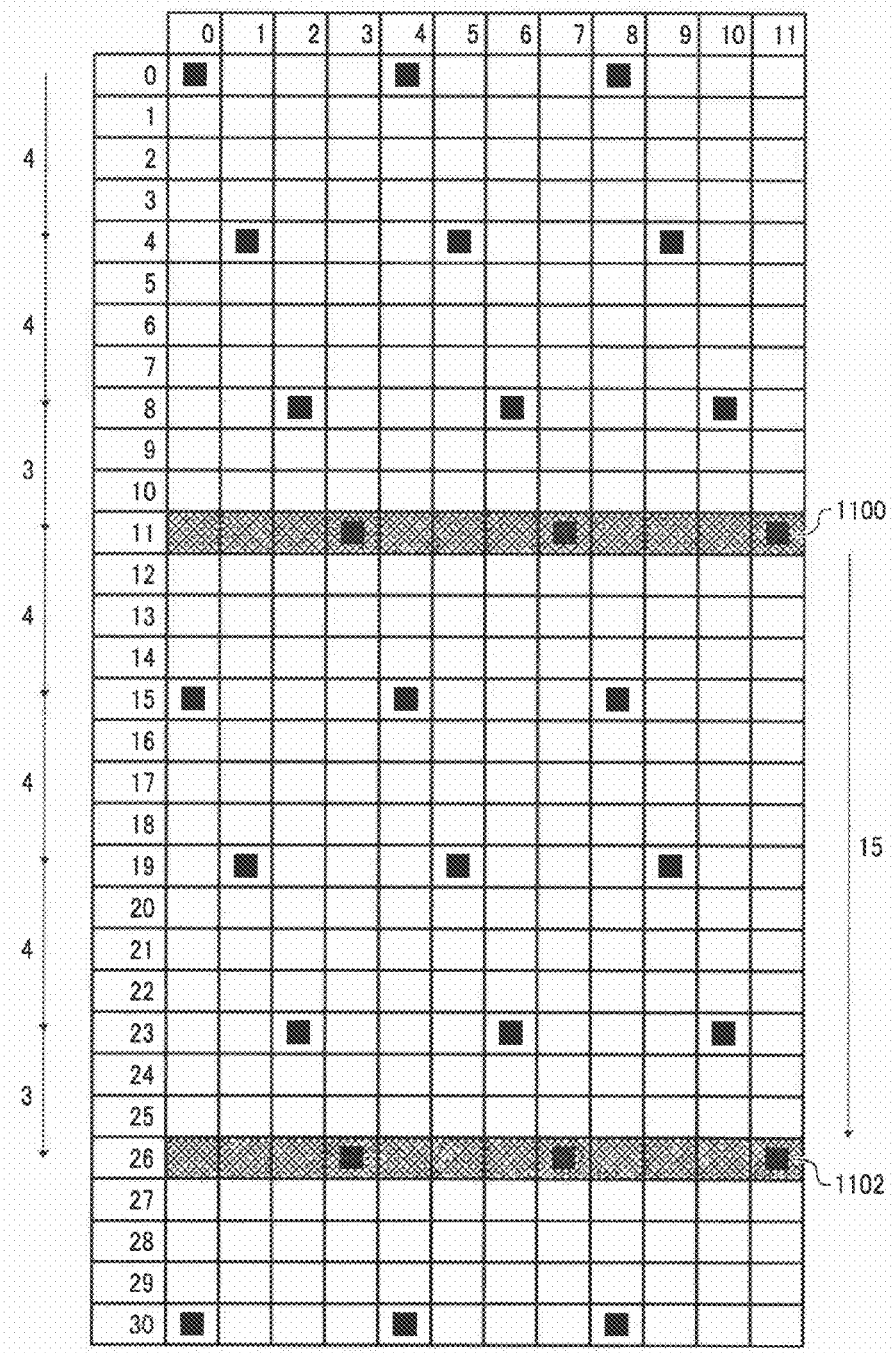
FIG. 15 is a schematic diagram for explaining a first modification of the size adjusting process.

FIG. 15 is a schematic diagram for explaining a first modification of the size adjusting process performed at Step S903 show in FIG. 12. To increase accuracy of the size-adjustment, the offset value P of the image bit to be inserted to L number of the sub-scanning lines varies in the adjacent R address lines. In the example shown in FIG. 15, the size-adjustment proportion is 6.66%, i.e., one line is added for every 15 lines. In this case, if a size of the image data 808A is adjusted, N of 4 and P of 4 are used. If a size of the image data 808B is adjusted, because a square root of 15 is 3.87, N is set to an integer closest to 3.87, although which trades off the size-adjustment proportion. To obtain more accurate size-adjustment proportion, the F address value of the image bit is calculated based on a combination of offset values P' of (N±1).

In the example shown in FIG. 15, because of 15=4×3+3, three image bits with the offset value P of 4 and one image bit with the offset value P of 3 are inserted in L number of lines. This process is easily programmable by an assembler by executing, for example, following Equation (5):

$$\text{If } (\{(Radder)\% N\} \neq 3) \quad (5)$$
$$\{$$
$$\quad F\_adder = N \times (R\_adder)\% N + L$$
$$\}$$
$$\text{else}$$
$$\quad F\_adder = \{N \times (R\_adder)\% N\} - 1 + L$$

where F_addr is address value of an image bit in the sub-scanning direction, DEV_Mag is sub-pixel based magnification, N is integer closest to the square root of L, R_addr is address value of the image bit in the main-scanning direction, and % is residue operator in the C language. Although Equation (5) is described in the C language for the sake of convenience, Equation (5) can be translated to a corresponding assembly language by using proper conversion software.

From Equation (5), if the residue is 1 or 2, the offset value P is set to 4; if the residue is 0 or 3, then the offset value P is set to 3. Thus, an offset sequence of (4, 4, 3, 4) is obtained. In a sub-scanning line 1100 in gray highlight shown in FIG. 15, the offset value P is set to 3 when N is 3. Image bits are inserted to every 15 lines. The insertion pattern in the sub-scanning line 1100 is repeated in a sub-scanning line 1102, and image bits with the offset value P of 3 are added to the sub-scanning line 1102. Equation (5) can be modified, if a combination of different offset values Ps is used, so that image bits are scattered with optical offset values for every L number of lines. Thus, the modified programming and the modified process can be performed.

Figure 16:
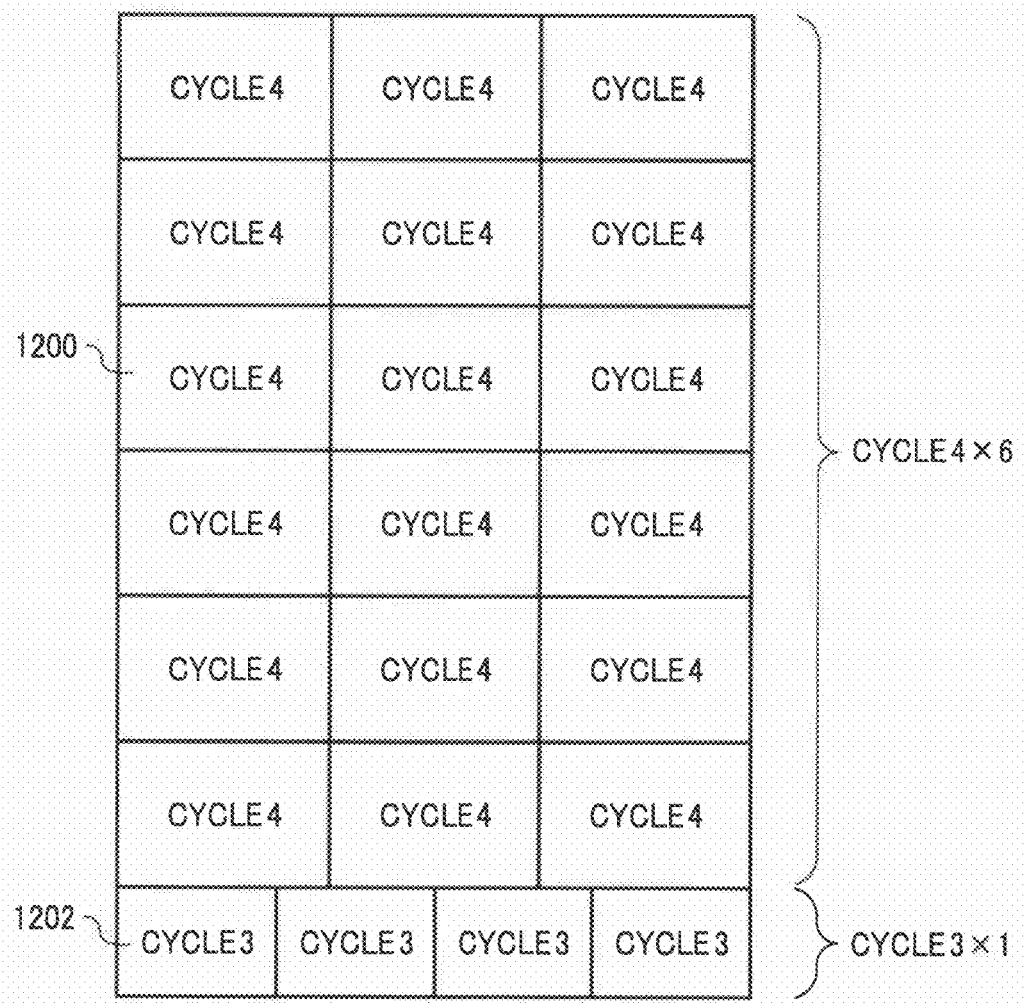
FIG. 16 is a schematic diagram for explaining a second modification of the size-adjusting process.

FIG. 16 is a schematic diagram for explaining a second modification of the size-adjusting process. In the second modification of the size-adjusting process, two different processes are performed including a cycle-N process using N and a cycle-N' process using N' to form an image with the size-adjustment proportion of $\{(1+1/15)\times100\}\%$. For example, when the size-adjustment proportion is set to 1/15, image bits equivalent to two lines are added to every 30 sub-scanning lines. The same effect can be obtained by repeating a cycle-4 six times (equivalent to 24 lines) and performing a cycle-3 one time where overlapping due to switching between the cycles is excluded. In the example shown in FIG. 16, an F address area 1200 is inserted at the cycle-4, and an R address area 1202 is inserted at the cycle-3.

Figure 17:
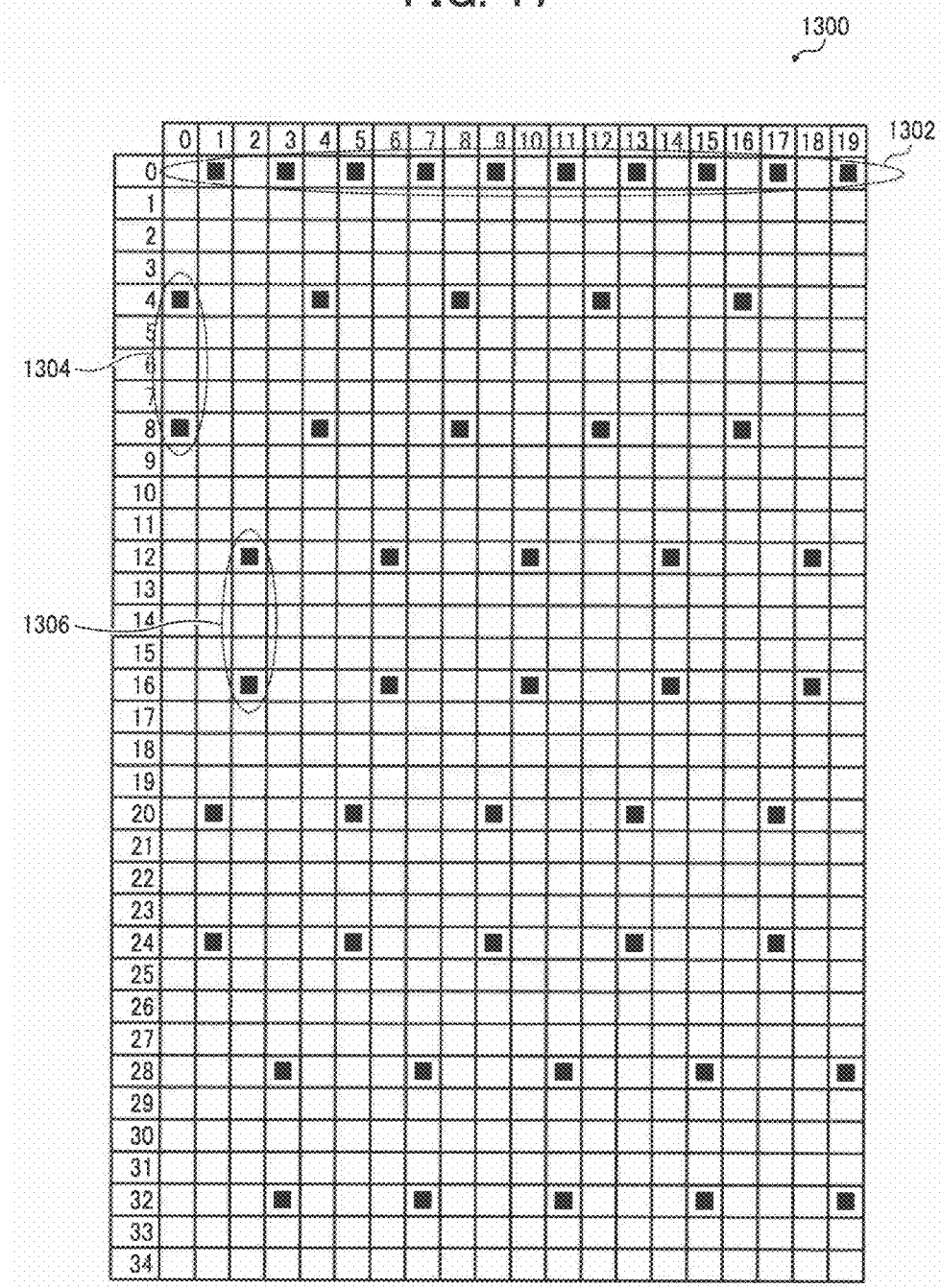
FIG. 17 is a schematic diagram for explaining a third modification of the size-adjusting process.

FIG. 17 is a schematic diagram for explaining a third modification of the size-adjusting process. In the third modification of the size-adjusting process, image data 1300 is processed with a cycle shorter than the cycles used in the size-adjusting processes with reference to FIGS. 13 to 16. As a result, even if a plurality of constant-width lines arranged at constant intervals are on an original image, it is possible to prevent occurrence of general defects such as moiré patterns. In the example shown in FIG. 17, image bits are added to positions on an F address line 1302 having the R address of 2m+1 (m is a positive integer). After that, assuming that the target size-adjustment proportion is 6.25% enlargement, lines 1304 and 1306 (hereinafter, "high-resolution lines 1304 and 1306") are added so that two lines are added to every 32 lines. The high-resolution lines are repeatedly added in the above manner until the last R address. As a result, a size-adjusted image without general defects such as moiré patterns is formed.

An address setting process of setting an address of an image bit to be inserted is described below. The address setting process can be used in any of the size-adjusting process and the first to third modifications of the size-adjusting process.

If the F address is 0, the R address corresponding to 2m+1 (m is a positive integer) is specified as an image-bit insertion address. If the F address is larger than 0, the F address corresponding to the R address is specified by performing following processes (a) to (d) based on the residue of N:

(a) if the residue of N of a target R address is 0, the F address value is set to (N, 2×N), (b) if the residue of N of the target R address is 1, the F address value is set to (N+L, 2×N+L), (c) if the residue of N of the target R address is 2, the F address value is set to (N+0.5L, 2×N+0.5L), and (d) if the residue of N of the target R address is 3, the F address value is set to (4+1.5L, 8+1.5L). After that, the default value of the next cycle is set to 2L×j, and the F address indicative of the sub-scanning line is calculated by performing the above four processes (a) to (d) based on the residue class of N (N=4) of the R address, where j is a maximum positive integer that satisfies j≦F/2L.

If the target R address is recursively selected, the F address value indicative of the sub-scanning line to be inserted is calculated by performing following processes (i) to (iv):

(i) if the residue of N of the target R address is 0, then the F address value is set to (N+2L×j, 2N+2L×j), (ii) if the residue of N of the target R address is 1, then the F address value is set to (N+L+2L×j, 2N+L+2L×j), (iii) if the residue of N of the target R address is 2, the F address value is set to (N+0.5L+2L×j, 2N+0.5L+2L×j), and (iv) if the residue of N of the target R address is 3, the F address value is set to (N+1.5L+2L×j, 2N+1.5L+2L×j).

In the example shown in FIG. 14, if the F address is specified as the image-bit insertion address for an even number of the R address, the F address is calculated in the order of the processes (ii), (i), (iv), and (iii). Assuming that, for example, L is 16, eight pixels are added to every 32 lines as shown in FIG. 14, or four pixels are added to every 16 lines, alternatively. If four pixels are added to every 16 lines, the F address value is set to a smaller value from among the two values, i.e., (N+2L×j), (N+L+2L×j), (N+0.5L+2L×j), or (N+1.5L+2L×j). If the R address values of the image bits to be inserted when the F address value=0 is switched from even numbers to odd numbers, the F address values are set to the larger value.

Although the example is explained assuming that L is 16, even if L is any other value, the image bits can be evenly scattered by setting N to a proper value by using a combination of the above-described size-adjusting processes with reference to FIGS. 13 to 16. The image-bit deleting process can be performed in the same manner as the above-described image-bit insertion processes.

In the third modification of the size-adjusting process, after the address of the image bit in the image data to be added is decided in the above manner, the GAVD 310 sends data about the image bit to be added to the output-data control unit 344. The LD driver 312 generates the drive control signal corresponding to the output timing, and sends the generated drive control signal to the VCSEL 200. Upon receiving the drive control signal, the VCSEL 200 lights up. Thus, the size-adjusted image is formed on the recording medium.

In this manner, the image forming apparatus according to the present embodiment controls the size-adjusting process by a pitch level of the LD elements of the VCSEL for exposure. Moreover, the image forming apparatus forms a size-adjusted image without general defects such as moiré patterns, satisfying various needs such as the duplex printing, the relatively high-speed printing for its size, and the high-quality image forming.

Furthermore, the image forming apparatus adjusts a size in the sub-scanning direction so that the size-adjusted image scarcely has a defect such as moiré patterns, and adds/deletes an image bit to a pixel size of which is defined by the LD elements. More particularly, a pixel is divided into sub-pixels matched with the beam pitch of the LD elements. Each sub-pixel is assigned to one channel of the LD elements for exposure. Thus, the size is adjusted in the sub-scanning direction by the line size defined by the beam pitch of the LD elements. The LD element can be a laser diode that emits a single beam or a surface emitting laser (VCSEL) that emits a plurality of laser beams from a two-dimensional area.

Thus, the image forming apparatus can add/delete a plurality of sub-scanning lines each of which has a width narrower than a width in the input resolution, which makes it possible to form the size-adjusted image without general defects such as moiré patterns.

Moreover, the image forming apparatus calculates addresses of image bits so that distance among the image bits becomes large as much as possible, and adds the image bits to the image data. The residue class is used in the address calculation so that a desired size-adjustment proportion is obtained when the sub-scanning lines are added or deleted. More particularly, the offset value P corresponding to a square root of L is used in the residue-class calculation, where L is the reference number of lines depending on the size-adjustment proportion. An integer closest to the square root of L is set to the offset value P. The distance between the image bits in the image space defined by the R address and the F address is calculated by using the offset value P based on the geometric average. When the image bits are added/deleted, the offset value P is specified based on the square root of L so that the add bits or the delete bits are scattered evenly. The offset value P can be an integer closest to the square root of L, a value equal to the square root of L, or a value larger than or smaller than the square root of L.

The image bits are added/deleted to/from positions with the R addresses and the F addresses that are obtained by using the residue-class calculation so that the desired size-adjustment proportion is obtained. Moreover, the image bits are scattered in the sub-scanning direction so that the size-adjusted image without general defects such as uneven density, moiré patterns, or jugged edges is formed. In other words, the image forming apparatus performs image-bit layout control while reducing a width of the sub-scanning lines to be added/deleted, thereby forming the high-quality size-adjusted image.

A computer working as the image forming apparatus performs a method of forming an image according to an aspect of the present invention by executing a computer program in a form described in a programming language such as an assembler language or the C language readable by the computer. The computer program can be stored in a recording medium readable by the computer.

According to an aspect of the present invention, a technology for controlling a size-adjusting process in a level of laser diode elements, and thereby forming a size-adjusted image without general defects such as moiré patterns. The technology is suitable for duplex-mode high-speed printing and high-quality image forming.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus for forming an image from image data formed with a plurality of pixels, the image forming apparatus comprising:
   a position deciding unit to determine a correction target position in the image data from a position of a reference pixel in the image data based on a size-adjustment proportion, the correction target position having a sub-scanning position and a main-scanning position;
   a correcting unit to perform correction with respect to the correction target position; and
   a size adjusting unit to adjust a size of the image data to obtain size adjusted image data by
      performing sub-scanning direction processing including causing the position deciding unit to sequentially determine positions of a plurality of correction target pixels in one line of pixels along a sub-scanning direction and causing the correcting unit to sequentially perform correction with respect to the correction target positions, and
      performing main-scanning direction processing including performing the sub-scanning direction processing for all the lines of pixels in the sub-scanning direction wherein
      the position deciding unit determines the correction target position in the sub-scanning direction according to at least a shift amount between pixels in the sub-scanning direction times a residue of a main-scanning position of the correction target position divided by the shift amount.

2. The image forming apparatus according to claim 1, further comprising:
   a light source that emits a laser beam modulated based on the size-adjusted image data; and
   a dividing unit that divides the pixels into sub-pixels each of which is matched with a beam pitch of the laser beam, wherein
   the position deciding unit decides a position of a sub-pixel as the correction target position.

3. The image forming apparatus according to claim 1, further comprising a storage unit that stores therein the image data, wherein
   the size-adjusting unit reads the image data in first-in first-out order from the storage unit, and adjusts the size of the image data obtained from the storage unit.

4. The image forming apparatus according to claim 1, wherein the correcting unit performs correction with respect to the correction target position by adding a pixel at the correction target position or deleting a pixel at the correction target position.

5. The image forming apparatus according to claim 4, wherein when one pixel is added to every L number of pixels aligned in the sub-scanning direction or one pixel is deleted from every L number of pixels in the sub-scanning direction to obtain a predetermined size-adjustment proportion, the position deciding unit determines the correction target position by calculating an integer equal to or larger than a square root of L and setting the shift amount to the integer.

6. The image forming apparatus according to claim 4, wherein when one pixel is added to every L number of pixels aligned in the sub-scanning direction or one pixel is deleted from every L number of pixels aligned in the sub-scanning direction to obtain a predetermined size-adjustment proportion, the position deciding unit determines the correction target position by calculating a smallest integer from among integers larger than a square root of L and setting the shift amount to the smallest integer.

7. The image forming apparatus according to claim 4, wherein when one pixel is added to every L number of pixels aligned in the sub-scanning direction or one pixel is deleted from every L number of pixels aligned in the sub-scanning direction to obtain a predetermined size-adjustment proportion, the position deciding unit determines the target position by calculating an integer closest to a square root of L and setting the shift amount to the integer.

8. The image forming apparatus according to claim 2, wherein the light source is a surface emitting laser, the apparatus further comprising a post-object oriented optical device that forms a latent image based on the laser beam emitted from the light source.

9. An image forming method for forming an image from image data formed with a plurality of pixels, the image forming method comprising:
   determining a correction target position in the image data from a position of a reference pixel in the image data based on a size-adjustment proportion, the correction target position having a sub-scanning position and a main-scanning position;
   performing correction with respect to the correction target position; and
   adjusting a size of the image data to obtain size adjusted image data by
      performing sub-scanning direction processing including performing the deciding to sequentially decide positions of a plurality of correction target pixels in one line of pixels along a sub-scanning direction and performing the correction to sequentially perform correction with respect to the correction target positions, and
      performing main scanning direction processing including performing the sub-scanning direction processing for all the lines of pixels in the sub-scanning direction wherein
      the correction target position in the sub-scanning direction is determined according to at least a shift amount between pixels in the sub-scanning direction times a residue of a main-scanning position of the correction target position divided by the shift amount.

10. The image forming method according to claim 9, further comprising storing the image data in a storage unit, wherein
   the adjusting includes reading the image data in first-in first-out order from the storage unit, and adjusting the size of the image data obtained from the storage unit.

11. The image forming method according to claim 9, wherein the performing correction includes performing correction with respect to the correction target position by adding a pixel at the correction target position or deleting a pixel at the correction target position.

12. The image forming method according to claim 11, wherein when one pixel is added to every L number of pixels aligned in the sub-scanning direction or one pixel is deleted from every L number of pixels in the sub-scanning direction to obtain a predetermined size-adjustment proportion, the determining includes determining the correction target position by calculating an integer equal to or larger than a square root of L and setting the shift amount to the integer.

13. The image forming method according to claim 11, wherein when one pixel is added to every L number of pixels aligned in the sub-scanning direction or one pixel is deleted from every L number of pixels aligned in the sub-scanning direction to obtain a predetermined size-adjustment proportion, the determining includes determining the correction target position by calculating a smallest integer from among integers larger than a square root of L and setting the shift amount to the smallest integer.

14. The image forming method according to claim 11, wherein when one pixel is added to every L number of pixels aligned in the sub-scanning direction or one pixel is deleted from every L number of pixels aligned in the sub-scanning direction to obtain a predetermined size-adjustment proportion, the determining includes deciding the target position by calculating an integer closest to a square root of L and setting the shift amount to the integer.

15. A non-transitory computer readable storage medium having instructions stored therein, which when executed by a processor in an image forming apparatus causes the apparatus to perform a method for forming an image from image data formed with a plurality of pixels, the the method comprising:
   determining a correction target position in the image data from a position of a reference pixel in the image data based on a size-adjustment proportion, the correction target position having a sub-scanning position and a main-scanning position;
   performing correction with respect to the correction target position; and
   adjusting a size of the image data by
      performing sub-scanning direction processing including performing the deciding to sequentially decide positions of a plurality of correction target pixels in one line of pixels along a sub-scanning direction and performing the correction to sequentially perform correction with respect to the correction target positions, and
      performing main-scanning direction processing including performing the sub-scanning direction processing for all the lines of pixels in the sub-scanning direction, thereby obtaining size-adjusted image data, wherein
      the correction target position in the sub-scanning direction is determined according to at least a shift amount between pixels in the sub-scanning direction times a residue of a main-scanning position of the correction target position divided by the shift amount.

* * * * *